United States Patent Office 3,420,685
Patented Jan. 7, 1969

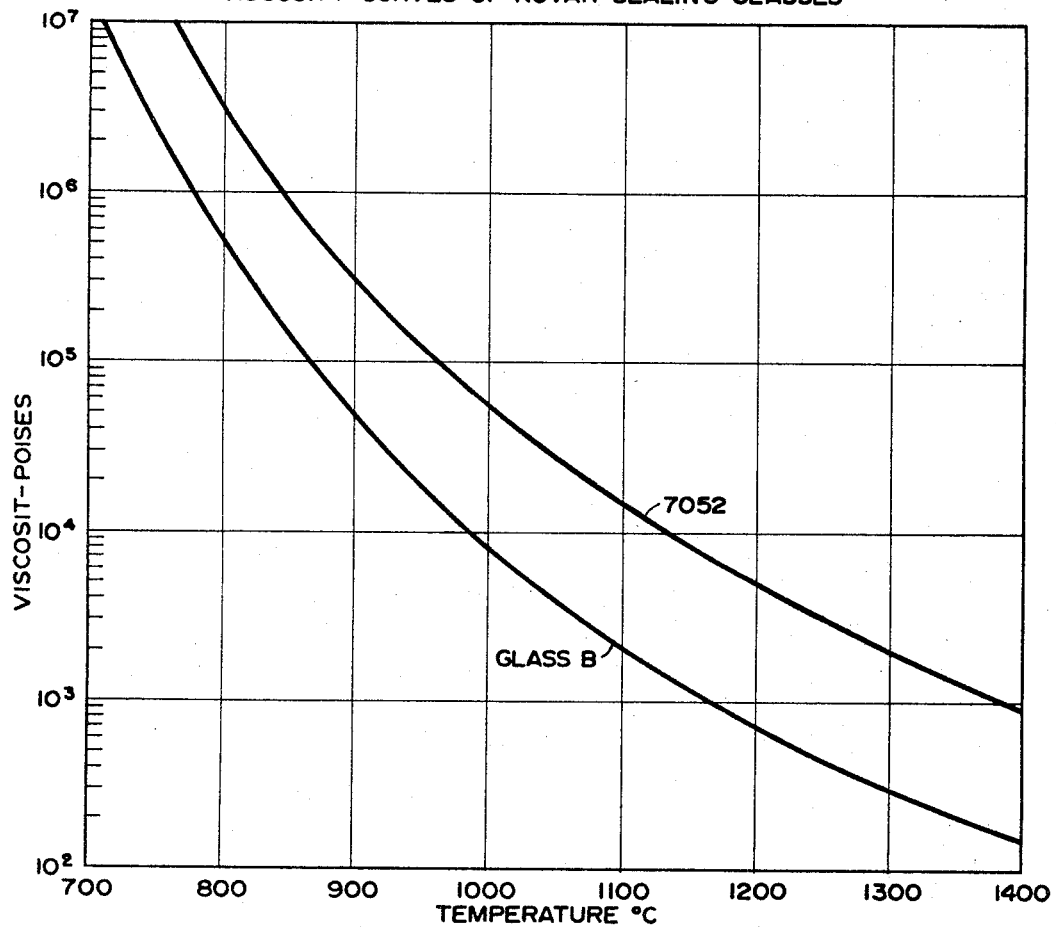

3,420,685
KOVAR SEALING GLASS
Francis W. Martin, Painted Post, N.Y., assignor to Corning Glass Works, Corning, N.Y., a corporation of New York
Filed Oct. 20, 1965, Ser. No. 498,844
U.S. Cl. 106—54  2 Claims
Int. Cl. C03c *3/08;* B32b *17/06*

This invention relates to glass-to-metal seals and more particularly it relates to an improved glass composition for forming seals with metal alloys of nickel, cobalt, and iron.

In order to bond glasses and metal together effectively, it is necessary that the linear expansion of the glass must closely match that of the metal over a wide temperature range. It has heretofore been shown that an alloy known as "Kovar," which comprises 28% nickel, 18% copper, and 53% iron, is particularly suitable for sealing with certain low expansion glasses. In making hermetic seals between such alloys and the glass for electrical purposes, it is not only essential that the expansion characteristics of the metal and the glass be sufficiently well matched, but it is also desirable that the glass have high chemical durability and electrical resistivity. The working temperature of the glass must be sufficiently low to avoid over-oxidizing or melting of the metal when heated to the glass sealing temperature and the glass must have a melting temperature sufficiently low to permit production in conventional melting units.

One particularly suitable glass for sealing with Kovar is sold commercially by Corning Glass Works under the designation Code 7052. While this glass is useful in forming most types of seals with Kovar, it is not entirely satisfactory in making multiform sealing beads where a softer glass is desired that could be sealed at a lower temperature or for a shorter time.

It is therefore an object of the present invention to provide an improved Kovar sealing glass.

It is a further object of the present invention to provide a Kovar sealing glass for the use as multiform sealing beads.

In accordance with the present invention, I have discovered a glass composition containing in weight percent on the oxide basis 64 to 68% of silica, 19 to 21% of boric oxide, 1 to 3% of alumina, 0.5 to 1.5% of lithium oxide, 1 to 3% of sodium oxide, 5 to 7% of potassium oxide, and 3 to 5% of zinc oxide. This glass composition can be sealed at a lower temperature and for a shorter time than the conventionally known Kovar sealing glasses.

My invention is further illustrated by the drawing which shows a comparison of the viscosity curves of a preferred glass composition prepared according to the present invention and the conventional Kovar sealing glass composition. It is readily apparent that the viscosity curve of the preferred composition designated as glass B is much steeper than the conventional glass Code 7052. The data plotted on the graph may be used to obtain the sealing temperature required for the indicated glasses. For example, in a particular application following current conventional practices, the sealing glass is sealed to the Kovar at a viscosity of about $3 \times 10^4$ poises which corresponds to a temperature of 1040° C. for the conventional glass composition, whereas the preferred glass composition can be sealed at a substantially lower temperature of 925° C. Further the conventional glass has a softening point of 713° C., whereas the novel composition has a much lower softening point of 676° C.

The lower softness and the steeper viscosity curves of the novel glass may be attributed to lowering the alumina content of the glass to a very low amount of from 1 to 3% and by using zinc oxide which has a lower expansion factor than other second group oxides. The total amount of alkali metal oxides should be relatively high up to about 8 to 9%, and, with regard to the specific alkali metal oxides, to avoid the tendency of devitrification, the amount of lithium oxide should not be greater than 1.5% while the potassium to sodium ratio should be kept relatively high above about two to one.

My invention is further illustrated by the following Examples, which I have set forth in table form, for various compositions prepared according to the present invention. These I have compared in glass composition and product properties to the conventional Kovar sealing glass designated as Code 7052. The weight percent shown in the table below are as calculated from the respective batches and are on the oxide basis:

TABLE I

|  | A | B | C | D | E | 7052 |
|---|---|---|---|---|---|---|
| $SiO_2$ | 65 | 66 | 67 | 66 | 66 | 65.5 |
| $B_2O_3$ | 20 | 20 | 20 | 20.5 | 19 | 15.3 |
| $Al_2O_3$ | 2 | 2 | 2 | 2 | 2 | 9.0 |
| $Li_2O$ | 2 | 1 | 1 | 1 | 1 | 1.1 |
| $Na_2O$ | 3 | 2 | 2 | 2 | 2 | 2.1 |
| $K_2O$ | 5 | 6 | 5 | 5.5 | 5.5 | 3.1 |
| $ZnO$ | 3 | 3 | 3 | 3 | 3 |  |
| $BaO$ |  |  |  |  |  | 3.0 |
| $KCl$ |  |  |  |  |  | 1.0 |
| $F$ |  |  |  |  | 1.5 |  |
| Softening point (° C) | 680 | 676 | 689 | 676 | 665 | 713 |
| Annealing point, (° C) | 502 | 486 | 490 | 486 | 473 | 480 |
| Strain point, (° C) | 469 | 448 | 455 | 448 | 440 | 438 |
| Expansion $\times 10^{-7}$/° C | 50.1 | 49.3 | 46.7 | 49.3 | 50.4 | 45.6 |

I claim:
1. A glass composition for forming seals with an alloy of nickel, cobalt, and iron consisting essentially in weight percent on the oxide basis of 64 to 68% of silica, 19 to 21% of boric oxide, 1 to 3% of alumina, 5 to 7% of potassium oxide, 1 to 3% of sodium oxide, 0.5 to 1.5% of lithium oxide, and 2 to 4% of zinc oxide.

2. A glass composition for forming seals with an alloy of nickel, cobalt, and iron consisting essentially on the oxide basis in weight percent of about 66% of silica, 20% of boric oxide, 2% of alumina, 6% of potassium oxide, 2% of sodium oxide, 1% of lithium oxide, and 3% of zinc oxide.

References Cited

UNITED STATES PATENTS

| 2,392,314 | 1/1946 | Dalton | 106—54 |
| 2,478,626 | 8/1949 | Grigorieff | 106—54 XR |
| 2,937,100 | 5/1960 | Oldfield et al. | 106—54 |

HELEN M. McCARTHY, *Primary Examiner.*

U.S. Cl. X.R.

161—196